United States Patent Office 3,763,137
Patented Oct. 2, 1973

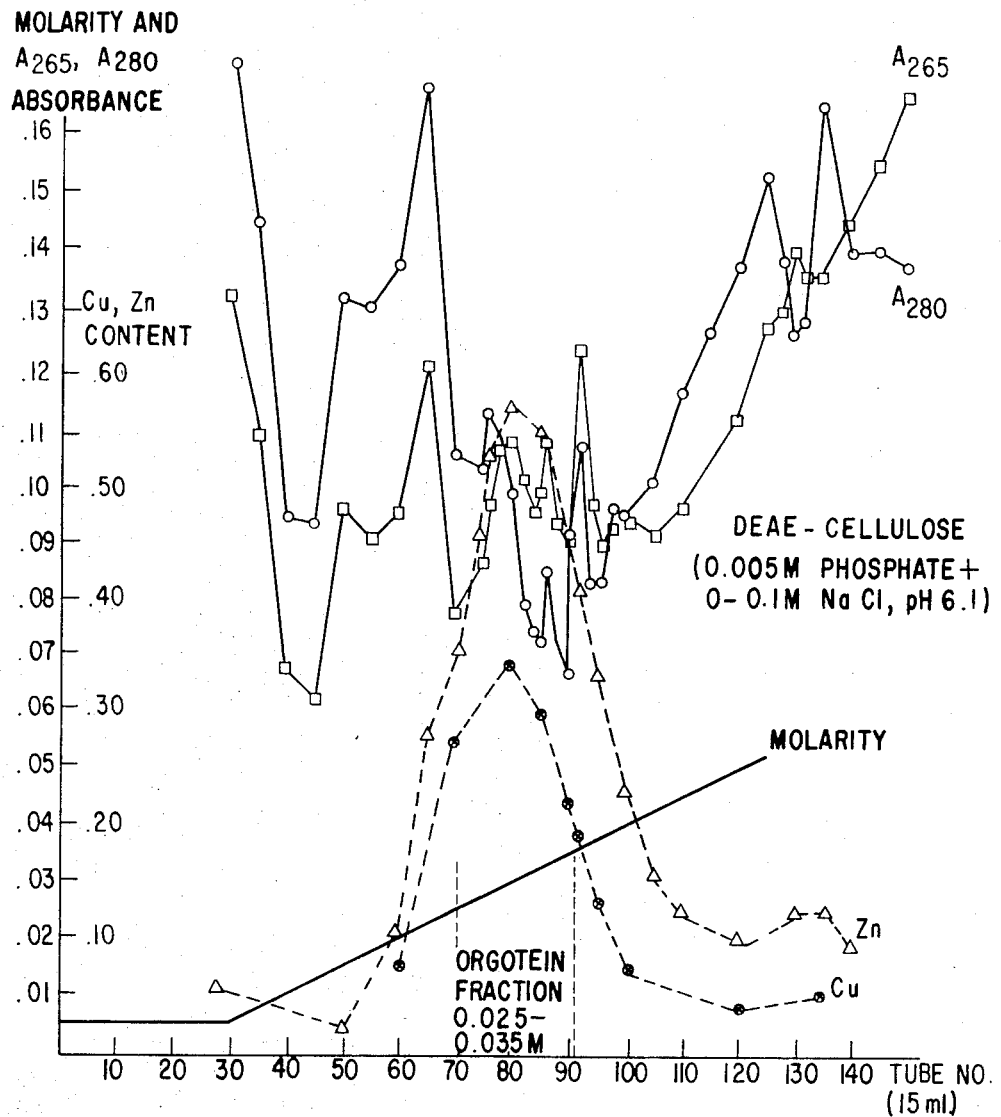

3,763,137
ISOLATION OF ORGOTEIN FROM RED BLOOD CELLS
Wolfgang Huber, San Francisco, Angelika Huebner, Palo Alto, and Mark G. Saifer, Berkeley, Calif., assignors to Diagnostic Data, Inc., Mountain View, Calif.
Filed Dec. 7, 1971, Ser. No. 205,610
Int. Cl. A61k 17/00; C07g 7/04
U.S. Cl. 260—113
13 Claims

ABSTRACT OF THE DISCLOSURE

Substantially pure orgotein is obtained in a single chromatographic purification step from the mixture of soluble proteins present in bovine, human or other red blood cells by chromatographing an aqueous solution of the mixture of proteins having a pH of about 6 and an ionic strength below about 0.01 M over a DEAE-cellulose or other weakly basic ion exchange column; washing the column free of hemoglobin; selectively eluting the adsorbed orgotein at a higher ionic strength; and separating orgotein from that portion of the eluate having the maximum divalent metal content.

---

This invention relates to a process for the production of substantially pure orgotein.

Orgotein defines a family of protein congeners having a characteristic combination of physical, chemical and pharmacological properties. Each of these congeners is characterized physically by being the isolated, substantially pure form of a globular, buffer and water-soluble protein having a highly compact native conformation which, although heat labile, is stable to heating for several minutes at 65° C. in water or a buffer solution containing a salt of a divalent metal having an ionic radius of 0.60 to 1.00 A. and which on gel electrophoresis at pH 8.45 in .01 M tris-glycine buffer gives a characteristic multiple-band pattern. Chemically, each is characterized by containing all or all but one of the essential amino-acids, a small percentage of carbohydrate, no lipids, 0.1 to 1.0% metal content provided by about 3 to 5 gram atoms per mole of one or more chelated divalent metals having an ionic radius of 0.60 to 1.00 A., and substantially no chelated monovalent metals or cell poisons in the molecule. Pharmacodynamically, each of the congeners is characterized by being a nontoxic, immunologically well-tolerated, injectable protein whose pharmacological activity includes anti-inflammatory activity which, like its compact conformation, is related to its chelated divalent metal content. Immunological relatedness of an orgotein congener is sufficient to enable its antibodies prepared in the rabbit or other suitable animal to recognize as an antigen one or more other orgotein congeners and/or for one or more of the antibodies to other orgotein congeners to recognize it as an antigen, as evidenced in gel immunoelectrophoresis and/or gel immunodiffusion. Although some of the physical and chemical properties and the type and degree of pharmacodynamic efficacy of orgotein vary from congener to congener, all orgotein congeners possess the above combination of properties.

From recent literature data, it is now apparent that the orgotein family of metalloproteins includes the proteins previously isolated in various states of purity and given the names repatocuprein, Mann and Keilin, Proc. Royal Soc. for Biol. Sci., 126, 303 (1939); cerebrocuprein Porter and Ainsworth, J. Neurochem., 1, 260 (1957); erythrocuprein, Markowitz et al., J. Biol. Chem., 234, 40 (1959); and cytocuprein, Carrico and Deutsch, J. Biol. Chem., 244, 6087 (1969). For other references, see Mohamed and Greenberg, J. Gen. Physiol., 37, 433 (1954); Porter and Folch, Arch. Neurol. Psychiat., 77, 8 (1957); Porter and Ainsworth, J. Neurochem., 5, 91 (1959); Krimmel et al., J. Biol. Chem., 234, 46 (1959); Wyman, Biochem. Biophys. Acta, 45, 387 (1960); Shields et al., J. Clin. Inv., 40, 2007 (1961); Markowitz et al., Anal. Chem., 33, 1594 (1961); Porter et al., Arch. Biochem. Bioph., 105, 319 (1964); Stansell and Deutsch, J. Biol. Chem., 240, 4299 (1965); ibid., 240, 4306 (1965); Stansell and Deutsch, Clin. Chem. Acta, 14, 598 (1966); McCord and Fridovich, J. Biol. Chem., 244, 5753 (1969); Hartz and Deutsch, J. Biol. Chem., 244, 4565 (1969); McCord and Fridovich, J. Biol. Chem., 244, 6056 (1969); Carrico and Deutsch, ibid., 245, 723 (1970). These metallo-proteins have been reported to possess very high superoxide dismutase (sodase) activity. See McCord and Fridovich, J. Biol. Chem., 244, 6049 (1969); Keele, McCord and Fridovich, J. Biol. Chem., 245, 6176 (1970); ibid, 246, 2875 (1971).

In application Ser. No. 576,454, filed Aug. 31, 1966, now abandoned (Belgium Pat. 687,828, British Pat. 1,160,151) there is disclosed a multi-step process for the isolation of orgotein from animal tissue, e.g., bovine liver.

In application Ser. No. 150,809, filed June 7, 1971, now U.S. Pat. 3,687,927, there is disclosed an improved process which eliminates several steps and increases the yield substantially.

In U.S. Pat. 3,579,495, there is claimed a process for the isolation of orgotein from red blood cells by a multi-step process which includes a solvent pre-purification to remove the hemoglobin and a heating step, in an overall yield of about 0.01%, calculated on the packed red cells.

In some of the literature references cited above, a DEAE-cellulose chromatographic purification step was used as part of a multi-step process for isolating orgotein from red blood cells. In the simplest of these processes, the red blood cells were freed of hemoglobin by solvent precipitation and then $K_2HPO_4$ and acetone-fractionated. A portion of the fractionated soluble proteins of lysed bovine red blood cells was chromatographed at pH 7.4, yielding from 3 liters of packed cells 190 mg. of orgotein having a superoxide dismutase activity of 3,300 units/mg. (.006% overall yield; 60% recovery of orgotein). This process, while acceptable on a laboratory scale, is not feasible on a commercial scale. For example, to produce one kilogram of orgotein would require over 7,500 liters of chloroform, 4,500 liters of ethanol, 7,000 kg. of $K_2HPO_4$ and 5,000 liters of acetone, if the process were scaled up without change.

It has been discovered that by the process of this invention the solvent used to separate the hemoglobin, the $K_2HPO_4$ used to separate the carbonic anhydrase, and the solvent used to precipitate the orgotein can be eliminated, making the process extremely practical on a commercial scale.

In the present process, substantially pure orgotein can be isolated in high yield from lysed red blood cells in a single chromatographic purification step without the necessity of an organic solvent or salt pre- or post-purification. It is the basis of this invention that although hemoglobin constitutes at least 96% of the soluble proteins in red blood cells, and 70% or more of the remainder of the protein is carbonic anhydrase, both can be separated in the same step in which the orgotein is isolated in substantially pure form. The simplicity and economy of the instant process is such that overall production and material costs are about one-tenth the lowest costs heretofore possible on a commercial scale. Equally surprising, these huge amounts of undesired protein do not bind the column adsorbent employed in this process, which permits its ready regeneration and reuse.

SUMMARY OF THE INVENTION

According to this invention, substantially pure orgotein is isolated from a mixture of buffer-soluble red blood cell proteins in a single chromatographic purification step in a novel process in which an aqueous solution of the mixture of proteins having an ionic strength of less than about 0.01 M is contacted with an ion exchange resin having weakly basic groups, thereby adsorbing the orgotein on the resin; the adsorbed orgotein is selectively eluted from the column with an aqueous eluant having a higher ionic strength; and orgotein is separated from the fraction of the eluate having the maximum divalent metal content; by employing a starting mixture of proteins containing both hemoglobin and carbonic anhydrase, conducting the chromatographic separation at a pH of about 6 and washing the ionic exchange resin free of hemoglobin before eluting the orgotein adsorbed thereon.

DETAILED DISCUSSION

The soluble proteins of the red blood cells of a wide variety of species can be employed in the process of this invention. Basically, those which are operable contain orgotein having an isoelectric point which differs from that of the carbonic anhydrase in the mixture by at least about one pH unit. Preferred are red blood cell soluble proteins containing orgotein which has an isoelectric point of about 4.5–5.5. Examples are bovine, chicken and human red blood cells. Others are rabbit, monkey, rat, etc. Bovine red blood cell soluble proteins are most preferred.

Red blood cells, which on the average make up about 35–45% by volume and about 39–50% by weight of whole blood of many mammals, are separated from the plasma of the blood by centrifuging, although gravity alone will suffice. Washing the separated cells and re-centrifuging removes residual plasma adhering to the compacted cells. Saline or buffer can be used, of a sufficient osmolarity to avoid the risk of premature lysis.

An especially preferred method of lysis is by sonication, i.e., disruption of the cells with ultra sound. This process has the advantage of not materially increasing the volume of the starting solution of proteins and not introducing any extraneous salts or organic compounds into the starting protein solution.

After removal of the insoluble cell components which constitute about 2% by weight of the packed cells, a solution of the soluble proteins of the lysed red blood cells is then contacted with the chromatographic adsorbant so as to adsorb the orgotein thereon.

Because dissolved salts markedly affect the adsorbability of the orgotein on the chromatographic adsorbant, the solution of starting soluble proteins should have a low ionic strength, i.e., less than about 0.01 M, e.g., 0.001–0.005 M. If the solution has a higher ionic strength, it can readily be reduced by dilution or by simple membrane dialysis against water or a buffer solution of about $1-5 \times 10^{-3}$ M.

The exact nature of the salt providing the ionic strength to the starting solution is not critical. Phosphate salts are preferred because the desired pH of about 6 can readily be maintained by this buffer at the desired low ionic strength. Others are salts of boric acid, cacodylic acid, citric acid, acetic acid, succinic acid, maleic acid, collidine-HCl, tris-glyine-HCl, etc. See also J. Gomori, "Methods in Enzymology," vol. I, pp. 136–146 (1955), especially buffers No. 5–8 and 10–18.

The process of this invention is preferably conducted throughout at a pH of about 6, i.e., 5.7–6.3, including the step of adsorbing the orgotein on the chromatographic adsorbent. However, it is the selective elution step, more than the adsorbing step, whose operability is dependent upon pH. Therefore, although it is not preferred, the starting solution of soluble proteins can have a somewhat higher or lower pH, e.g., 5–8. In such a case, the chromatographic adsorbent should then be equilibrated to the eluting pH of about 6 before attempting to selectively elute the orgotein therefrom.

The chromatographic adsorbant employed in the process of this invention is an ion exchange resin having weakly basic groups having an attraction for acidic ions. Examples are the known cellulose and polysaccharide ion exchange resins, including the lower-alkylamino-lower-alkyl-celluloses, e.g., diethylaminoethyl-cellulose (DEAE), triethylaminoethyl-cellulose (TEAE), diethylaminoethyl-Sephadex and QAE-Sephadex (quaternary aminoethylated cross-linked dextran resin). Such resins should have a comparatively low absorptive capacity, e.g., from about 1.0 to 5 milliequivalents per gram. For example, DEAE-cellulose may have a capacity of 1.0 milliequiv./g. (dry weight); DEAE-Sephadex, 3.5±0.5 milliequiv./g.; and TEAE-Sephadex, 0.55 to 0.75 milliequiv./g. DEAE-cellulose, TEA-cellulose and cross-linked dextran resins containing diethylaminoethyl groups, especially the former, are preferred. Fibrous DEAE-cellulose is preferred because of its flow rate, which is higher than microgranular forms. However, the latter has somewhat higher resolution power.

The orgotein is isolated by selective elution from the ion exchange resin. The process of this invention involves adsorbing the orgotein along with other proteins onto the ion exchange resin, separating the hemoglobin and other nonadsorbed proteins from the resin and thereafter selectively eluting the orgotein from the resin and recovering the orgotein from the fraction of the eluate containing substantially only orgotein. These steps are conducted with the resin as the bed of a chromatographic column.

The amount of ion exchange resin employed, although not critical, affects the yield and purity of the isolated orgotein. Preferably about 0.25 to 0.5 ml. of resin per milliliter of packed red blood cells is employed. A greater ratio (vol./vol.) of resin to packed red blood cells does not have any particular advantage over a ratio of about 0.5 to 1.

Because the hemoglobin is not adsorbed on the ion exchange resin below its isoelectric point, its removal is readily accomplished by washing the column with an aqueous eluant, preferably one having a pH of about 6. To prevent elution of the orgotein, the ionic strength of the aqueous media should be less than about 0.01 M. Water or preferably a buffer as defined above, especially phosphate buffer, can be employed in this step. Often only several times the void volume of the column is required to free the column of hemoglobin. Hemoglobin removal can readily be determined from the color of the effluent.

Having removed the hemoglobin, the next step is the separation of the orgotein from the carbonic anhydrase, which constitutes most of the remaining protein, and the minor proportions of other proteinaceous impurities. This can be accomplished if the orgotein is selectively eluted from the column employing an aqueous medium having a pH of about 6, i.e., 5.7 to 6.3, and varying ionic strength so that the adsorbed proteins are sequentially eluted. As stated above, it is most important that the pH of the eluting media be about 6. At other pH the carbonic anhydrase is eluted at least partially at the same time as the orgotein, resulting in the production of highly impure rather than substantially pure orgotein.

A convenient method of sequentially eluting the adsorbed proteins from the resin is the use of a buffer of an ionic strength gradually increasing from below about 0.01 M to above 0.03 M. In the case of DEAE-cellulose, a large portion of the undesired proteins are eluted at an ionic strength of less than 0.02 M. The orgotein is eluted with about 0.025–0.035 M buffer and the remaining undesired proteins are eluted at higher ionic strength. Generally, a final ionic strength of at least about 0.1 M is employed to ensure complete clearing of the column so that it can be regenerated for re-use.

Instead of a gradually increasing ionic strength gradient, a step-wise gradient can be employed, e.g., about .001–.005 M to elute the easily elutable protein impurities, about .02–.03 M to elute the orgotein, and about 0.1–0.5 M to clear the column of residual protein impurities.

Irrespective of whether the resin is eluted with buffer of continuously increasing or step-wise increasing ionic strength, in order to obtain orgotein of high purity, it is important that as well selected a cut as possible be taken. Thus, to a certain degree, over yield must be balanced against final purity. However, if the cut is taken at precisely the optimal point, a high yield of substantially pure orgotein is obtained. An essential aspect of this invention is accurately determining the point at which the orgotein cut should be taken.

In the preferred aspect of this invention, the chelated divalent metal content and preferably also the 280 nm. and 265 nm. absorbances of the eluant are monitored continuously or at regular frequent intervals. The elution of the orgotein can be detected by a pronounced increase in divalent metal content of the eluate. Since orgotein usually occurs in its natural state as a Cu-Zn mixed chelate, measurement of the content of copper or preferably both of these metals provides a precise method for detecting orgotein in the eluate.

To obtain a cut containing orgotein of highest purity, the $A_{280}$ and $A_{265}$ absorbance of the eluate is also measured. Within the eluate fraction having substantial Cu and Zn contents, the cut is taken at the point where the ratio of $A_{265}/A_{280}$ reaches a maximum, i.e., is close to or greater than one. The end of the orgotein cut is taken at the point where Cu and Zn contents drop and the $A_{265}/A_{280}$ ratio again falls, indicating an increase in content of non-orgotein proteins.

A convenient method for instantaneously determining divalent metal content is by atomic absorption spectrophotometry. Apparatus useful for simultaneous measurement of copper and zinc is Model 353, Instrument Laboratories, Inc. Lexington, Mass.

$A_{280}$ and $A_{265}$ absorbances can be determined continuously or intermittently in a conventional manner or ratios may be recorded directly by a differential spectrophotometer.

With reference to the drawing, there is shown curves of the Cu and Zn contents and $A_{265}$ and $A_{280}$ absorbances of the eluate of the ion exchange chromatography described in Example 1. These measurements were made for each aliquot of eluate. As the curves show, Cu and Zn contents rise precipitously when the molarity of the eluate reaches about 0.02 M. After peaking at about 0.02 M, these contents drop precipitously. $A_{280}$ and $A_{265}$ nm. absorbances reveal a sharp increase at 0.025 M with the $A_{265}/A_{280}$ ratio at or near a maximum. This is followed by a gradual decrease in absorbance and then a rise again at about 0.034 M.

Alternatively, the orgotein and carbonic anhydrase, and lesser amounts of other residual proteins, can be eluted simultaneously from the ion exchange column, e.g., with 0.005 M phosphate buffer brought to ionic strength of about 0.02–0.06 with NaCl, and orgotein isolated from the eluted mixture of proteins by a heat treatment, a second basic ion exchange resin chromatographic separation, or any combination thereof.

Pure orgotein can be produced by a heat treatment of the DEAE-cellulose pre-purified orgotein as described in U.S. 3,579,494, or in copending application Ser. No. 3,492, filed Jan. 16, 1970 now U.S. 3,624,251. A second ion exchange chromatographic purification can be conducted as described above or as claimed in copending application Ser. No. 3,538, filed Jan. 16, 1970.

In another variation, a large, e.g., 0.5–5 ml./ml. PRC, fast-flowing column can be used as a hemoglobin separation column for the soluble proteins of lysed and dialyzed, plasma-free red blood cells, the column being cleared of hemoglobin with low-ionic strength buffer, e.g., 0.005 M phosphate, after each lot of red blood cell soluble proteins is applied to the column. This procedure can be continued up to the point where traces of orgotein (as detected by the appearance of super-oxide dismutase activity and/or a rise in Cu and Zn contents) appears in the eluate. The orgotein can be selectively eluted or stripped from the hemoglobin-free, orgotein-loaded column with medium strength, e.g., 0.02–0.04 M ionic strength, buffer. If the orgotein is stripped from the column, the stripped orgotein can then be freed of carbonic anhydrase and other impurities by a heating step as described herein. After removing the precipitated proteins and dialysis to below 0.01 M ionic strength, the orgotein can, if desired, be further purified over a smaller, e.g., 0.05–0.5 ml./mg. of orgotein, second DEAE-cellulose ion exchange column, developed as described in Example 1.

The orgotein isolated by the process of this invention is of high quality and can be injected without immunologic side-reactions. As disclosed in U.S. 3,579,495, Belgium Pat. 687,828 and British Pat. 1,160,151, orgotein is useful, inter alia, as an anti-inflammatory agent. The thus-isolated orgotein may, however, contain trace amounts of extraneous proteins which, although they do not produce an immediate immunologic reaction, have the potential capability of doing so upon long-term parenteral administration. These trace proteins can be eliminated in several ways. One such way is by gel filtration using a microporous resin, e.g., Sephadex G–75 (epichlorohydrin cross-linked dextrain resin, Pharmacia, Sweden). The Sephadex has been swelled, refined and washed by standard techniques described in literature of the manufacturer. The packed columns are equilibrated with 0.05 M tris-HCl, pH 7.5, 0.005 M glycine, 0.15 M KCl, $10^{-4}$ $Cu^{++}$, $10^{-5}$ $Zn^{++}$, buffer and adjusted to a flow rate of about 2.0 ml./cm.$^2$ per hour. The addition of 5–10% dextrose or sucrose to the solution improves uniformity of application which improves subsequent resolution.

After application to the column, the column is developed with additional buffer solution. Individual fractions are collected. The emergence of peaks is determined by measuring the absorbance anywhere from 200 to 280 nm.

Ultrapure orgotein can also be produced by a post-heat treatment of the DEAE-cellulose isolated orgotein, as claimed in application Ser. No. 3,492, filed Jan. 16, 1970, now U.S. Pat. 3,624,251, by a second DEAE-cellulose ion exchange chromatographic purification, as claimed in copending application Ser. No. 3,538, filed Jan. 16, 1970; or by CM-cellulose chromatography.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Collect fresh bovine blood (870 ml.) in 3.8% sodium citrate (0.5 v./v.). Centrifuge at 4,000 r.p.m. at 0° C. Discard the plasma and wash the packed red cells (PRC) three times with 0.9% saline. Lyse the Prc by sonification for 5 minutes at room temperature (Biosonik III, No. 70 setting). Dialyze first against distilled water and then against 0.005 M phosphate buffer, pH 6.0 for 24 hours at 4° C. (4 changes of 4 liters each); volume increase ~110%.

Apply the dialyzed extract to a column (2.5 x 30 cm.; bed vol., 147 ml.) of DEAE-cellulose (fibrous DEAE-23, Reeve-Angel) equilibrated with 0.005 M phosphate buffer, pH 6.0. Develop the column at a kow rate of 240 ml./hr. with 0.005 M phosphate buffer. Most of the hemoglobin appears in the void volume and the remainder is removed with an additional 230 ml. (450 ml. total). Elution of the orgotein is effected with 4 liters of the same buffer having a NaCl concentration increasing from 0 to 0.08 M. Measure the Cu and Zn contents and $A_{265}$ and $A_{280}$ absorbance of the eluate as described above. Three major peaks appear, each with fine structure, starting at 575 ml., 750 ml. and 1,425 ml. of the gradient eluate. The orgotein (2nd peak) is present in the portion of the eluate where the $A_{265}/A_{280}$ absorbance ratio is 1.27 and the Cu and Zn contents are maximum. The 750 ml.–1030 ml. (0.025–0.035 M) portion of the gradient eluate contains substantially all of the orgotein in a high state of purity.

The eluation pattern is shown in the drawing, in which the Cu and Zn contents and $A_{265}$ and $A_{280}$ absorbance of the eluate is plotted. As seen in the drawing, Cu and Zn contents begin to rise precipitously at about tube 60. At tube 70, $A_{265}$ absorbance begins to rise and at about tube 80 exceeds $A_{280}$ absorbance. This portion of the eluate contains orgotein of the highest purity. Impurity content rises thereafter as evidenced by a rise in $A_{265}$ and $A_{280}$ absorbance accompanied by a drop in Cu and Zn contents. The contents of tubes 70–92 are collected and orgotein isolated therefrom.

Dialyze the orgotein cut against deionized water to about 0.3 to 0.45μ mho, filter through a .45 micron filter and lyophilize. About 52 mg. of orgotein is obtained, a yield of 0.013%, calculated on the packed red cells, with sodase activity of 2500 units/mg., which represents close to 75% of the total superoxide dismutase activity originally present in the lysate, as determined by a combination of the procedures of McCord and Fridovich, JBC, 244, 6049 (1969).

The column can be regenerated for reuse by washing it with buffer of an ionic strength of at least 0.1 M and up to 2 M and then rinsing with deionized water.

Following the procedure of Example 1, substantially pure orgotein is isolated from human, rabbit, rat and chicken red blood cells, respectively.

Following the procedure of Example 1, comparable results are obtained using TEAE-cellulose and a cross-linked dextran resin containing diethylaminoethyl groups (DEAE-Sephadex).

EXAMPLE 2

The procedure of Example 1 is followed exactly, except the hemoglobin-free column is freed of easily elutable proteins with about 500 ml. of 0.005 M phosphate buffer brought to 0.02 M ionic strength with NaCl, the orgotein is eluted with about 1,000 ml. of the same buffer brought to 0.035 M ionic strength with NaCl, the orgotein cut being taken from that portion of the eluate where the $A_{265}/A_{280}$ absorbance ratio is about 1 or greater and the Cu and Zn contents are maximum, and the column is cleared with about 1,000 ml. of the same buffer brought to 0.1 M ionic strength with NaCl.

EXAMPLE 3

Centrifuge, lyse and dialyze 2 units outdated human blood in ACD anticoagulant (1 unit–450 ml. blood in 67.5 ml. ACD; 100 ml. ACD contains 2.45 g. dextrose, .80 g. citric acid, 2.2 g. sodium citrate, calc. as hydrous) as described in Example 1.

Apply the dialyzed extract to a column (2.5 x 38 cm.; bed vol., 186.2 ml.) of the same equilibrated DEAE-cellulose employed in Example 1. Develop the column as described therein. Elute the orgotein with 6 liters of the same 0.005 M phosphate buffer having a NaCl concentration increasing from 0 to 0.10 M. Measure the Cu and Zn contents and $A_{265}$ and $A_{280}$ absorbance of the eluate as described above. The orgotein is present in the first peak with an $A_{265}/A_{280}$ ratio close to or greater than 1.0 and where the Cu and Zn contents are maximum. The cut eluted with a gradient of .05–.06 M NaCl (tubes 150–170, total volume about 200 ml.), contains substantially all of the orgotein in a high state of purity.

Dialyze the orgotein eluant cut against deionized water to about 0.3 to 0.45μ mho; filter through a .45 micron filter; and lyophilize. About 60 mg. of orgotein is obtained 0.0125%, calculated on the packed red cells).

Comparable results are obtained by a step-wise development of the column with 0.005 M phosphate buffer containing about 0.015 M concentration of NaCl to separate proteins more readily eluted than orgotein, with buffer containing about .03 M concentration of NaCl to elute the orgotein and with buffer containing about 0.1 M concentration of NaCl to clear the column.

EXAMPLE 4

Employing 1,100 ml. of fresh rabbit blood in 3.8% sodium citrate (0.5 v./v.). Centrifuge, lyse and dialyze as described in Example 1 (volume increase ≃100%).

Apply the dialyzed extract to a column (2.5 x 41 cm., bed vol., 201 ml.) of the same DEAE-cellulose employed in Example 1. Develop the column as described therein. Most of the hemoglobin appears in the void volume and the remainder is removed with an additional 500 ml. (650 ml. total). Elute the orgotein with 3 liters of the same 0.005 M phosphate buffer having a NaCl concentration increasing from 0 to 0.08 M. Measure the Cu and Zn contents and $A_{265}$ and $A_{280}$ absorbance of the eluate as described above. The orgotein is present in the first peak with an $A_{265}/A_{280}$ ratio close to or greater than 1.0 and the $Cu^{++}$ and $Zn^{++}$ at maximum absorbance. The cut eluted with a gradient of .020–.030 M NaCl (tubes 60–90, total volume about 240 ml.) contains substantially all of the orgotein in a high state of purity.

Dialyze the orgotein cut against deionized water to about 0.3 to 0.45μ mho, filter through a .45 micron filter and lyophilize. About 45 mg. of orgotein is obtained (0.01%), calculated on the packed red cells. Additional orgotein of lower purity is present in adjacent portions of the eluate.

Comparable results are obtained by a step-wise development of the column with 0.005 M phosphate buffer containing about 0.015 M concentration of NaCl to separate proteins more readily eluted than orgotein, with buffer containing about 0.02 M concentration of NaCl to elute the orgotein and with buffer containing about 0.1 M concentration of NaCl to clear the column.

POST-PURIFIED ORGOTEIN

The orgotein obtained according to the procedure of the above examples can be further purified by molecular sieve gel chromatography over a column (3.2 cm. x 88.5 cm.; total bed vol., 711.5 ml., void volume, 265.5 ml.) of Sephadex G-75 Superfine (Pharmacia, Sweden) epichlorohydrin cross-linked dextran resin, collecting the eluate in 5.4 ml. fractions and measuring the $A_{265}$ and $A_{280}$ absorptions thereof. Beginning at about fraction 50, these absorptions climb precipitously and reach a peak at about fraction 68. Fractions 66–73 contain a majority of the total orgotein in an ultrapure state. By fraction 98, these absorptions fall to zero until about fraction 116. The only significant impurity appears in tubes 118–150.

Orgotein obtained according to Example 1 also can be post-purified with a carboxymethylcellulose column. A CMC column of 11 ml. was prepared and equilibrated with 0.01 molar sodium acetate, pH 5.3. 40 mg. of the above DEAE-cellulose purified orgotein was dissolved in 0.01 molar acetate buffer, pH 5.3, and dialyzed against several changes of the same buffer. Insolubles, if any, were centrifuged off and the clear supernatant was layered on top of the CMC column. Flow rate was approximately 12 ml. per hour. The column was washed with 30 ml. of 0.01 molar acetate, pH 5.3, to elute the non-adsorbed proteins. Then elution was continued with a linear gradient from 0.01 molar to 0.1 molar sodium acetate, pH 5.3, in a total volume of 200 ml. Ultra-pure orgotein was eluted at 0.018 molar to 0.028 molar and isolated from the eluate in the manner described above.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the isolation of orgotein from red blood cells wherein a mixture of orgotein and other buffer soluble proteins in red blood cells is subjected to a chromatographic separation by
   (a) contacting the mixture of the buffer soluble proteins of lysed red blood cells as an aqueous solution having a low ionic strength through a column of an ion exchange resin having weakly basic groups, thereby adsorbing the orgotein on the resin;
   (b) washing the column free of hemoglobin with a buffer solution having a low ionic strength; and
   (c) eluting the adsorbed orgotein from the column with an aqueous medium having a higher ionic strength; the improvement which comprises eluting substantially pure orgotein from the column by the combination of (i) employing in steps (a) and (b) an aqueous medium having a pH of about 6 and below the isoelectric point of the hemoglobin and an ionic strength below about 0.01 M; (ii) eluting the adsorbed orgotein from the column in step (c) selectively with an aqueous medium having a pH from 5.7 to 6.3 and an ionic strength which increases gradually or in step-wise gradients from below about 0.02 M to above about 0.03 M; and (iii) isolating orgotein from the fraction of the eluate beginning where the ratio of $A_{265}/A_{280}$ reaches a maximum and ending where the Cu and Zn contents and $A_{265}/A_{280}$ ratio falls.

2. A process according to claim 1 wherein the starting mixture of proteins is the soluble proteins from bovine, rabbit, rat, chicken or human red blood cells.

3. A process according to claim 2 wherein the red blood cells are bovine.

4. A process according to claim 2 wherein the red blood cells are human.

5. The process of claim 1 wherein the resin is a tertiary amino-cellulose or -dextran resin.

6. The process of claim 5 wherein the cellulose resin is selected from the group consisting of diethylaminoethyl-cellulose, triethylaminoethyl-cellulose and a cross-linked dextran resin containing diethylaminoethyl groups.

7. A process according to claim 6 wherein the resin is diethylaminoethyl-cellulose.

8. A process according to claim 6 wherein the red blood cells are bovine, rabbit, rat, chicken or human.

9. A process according to claim 8 wherein the red blood cells are bovine.

10. A process according to claim 8 wherein the red blood cells are human.

11. The process of claim 8 wherein the resin is diethylaminoethyl-cellulose.

12. A process according to claim 11 wherein the red blood cells are bovine.

13. A process according to claim 11 wherein the red blood cells are human.

References Cited
UNITED STATES PATENTS

| | | | |
|---|---|---|---|
| 3,579,495 | 5/1971 | Huber | 260—115 |
| 3,624,251 | 11/1971 | Huber | 260—113 |
| 3,637,640 | 1/1972 | Huber | 260—115 |
| 3,687,927 | 8/1972 | Huber | 260—113 |

OTHER REFERENCES

The Proteins, vol. III, 1965, Neurath, pp. 14–26 and 80–82.

Biochim. Biophys. Acta, 45 (1960), 387–389, Nyman.

J. of Biol. Chem., vol. 240, No. 11, 1965, pp. 4299–2305, Stansell et al.

J. of Biol. Chem., vol. 244, No. 17, 1969, pp. 4565–4572, Hartz et al.

HOWARD E. SCHAIN, Primary Examiner

U.S. Cl. X.R.

260—112 B, 115; 424—177